(12) United States Patent
Jewell et al.

(10) Patent No.: US 11,331,998 B2
(45) Date of Patent: May 17, 2022

(54) SYSTEM FOR A HYBRID TORQUE CONVERTER WITH E-MOTOR ON AN OUTPUT

(71) Applicant: SCHAEFFLER TECHNOLOGIES AG & CO. KG, Herzogenaurach (DE)

(72) Inventors: Jeremy Jewell, Wooster, OH (US); Peter Rentfrow, Doylestown, OH (US)

(73) Assignee: Schaeffler Technologies AG & CO. KG, Herzogenaurach (DE)

(*) Notice: Subject to any disclaimer, the term of this patent is extended or adjusted under 35 U.S.C. 154(b) by 0 days.

(21) Appl. No.: 16/942,155

(22) Filed: Jul. 29, 2020

(65) Prior Publication Data
US 2022/0032761 A1 Feb. 3, 2022

(51) Int. Cl.
*F16H 45/02* (2006.01)
*F16H 45/00* (2006.01)
*B60K 6/38* (2007.10)
*F16H 41/24* (2006.01)

(52) U.S. Cl.
CPC .............. *B60K 6/38* (2013.01); *F16H 45/02* (2013.01); *B60Y 2200/92* (2013.01); *B60Y 2400/426* (2013.01); *F16H 41/24* (2013.01); *F16H 2045/002* (2013.01)

(58) Field of Classification Search
CPC ................ B60K 6/38; F16H 41/24; F16H 45/02–2045/0294; F16H 2045/0002; B60Y 2200/92; B60Y 2400/426
USPC .................................................... 192/3.28
See application file for complete search history.

(56) References Cited

U.S. PATENT DOCUMENTS

| | | | | |
|---|---|---|---|---|
| 5,789,823 | A * | 8/1998 | Sherman | B60K 6/383 290/47 |
| 6,478,101 | B1 * | 11/2002 | Taniguchi | B60K 6/547 180/65.22 |
| 7,810,592 | B2 * | 10/2010 | Klemen | B60L 50/16 180/65.225 |
| 8,540,602 | B2 * | 9/2013 | Ishikawa | B60W 20/40 477/5 |
| 2008/0060859 | A1 * | 3/2008 | Klemen | B60L 50/16 180/65.25 |
| 2010/0273606 | A1 * | 10/2010 | Roses | B60W 10/026 477/62 |

FOREIGN PATENT DOCUMENTS

JP     3553436 B2   8/2004

* cited by examiner

*Primary Examiner* — Tinh Dang
(74) *Attorney, Agent, or Firm* — Rutan & Tucker LLP; Hani Z. Sayed

(57) ABSTRACT

A hybrid powertrain includes a torque converter including an impeller, a turbine, and a stator, wherein the impeller is configured to receive torque from the engine input shaft without utilizing a torque converter cover or shell. The hybrid powertrain includes an electric machine including a rotor and motor stator, wherein the electrical machine is configured to transfer torque to a transmission input via the rotor.

16 Claims, 4 Drawing Sheets

SYSTEM FOR A HYBRID TORQUE CONVERTER WITH E-MOTOR ON AN OUTPUT

TECHNICAL FIELD

The present disclosure relates to transmissions, including modular hybrid transmissions.

BACKGROUND

Current P2 hybrid systems that include an e-motor connected to an input side of an undersized torque converter are subject to a severe increase in automatic transmission fluid (ATF) temperature due to the higher power input and relatively low oil volume of such a configuration. The undersized torque converter may require a significant sacrifice in torque ratio (TR) performance and in turn require a higher input torque to achieve a sufficient output torque. Higher input torques result in higher power input and greater heat dissipation through the oil. High oil temperatures can lead to increased requirements for vehicle cooling systems and degradation of permanent magnet performance.

SUMMARY

According to one embodiment, a torque converter includes an impeller, a turbine adjacent the impeller and configured to fluidly couple with the impeller, wherein the turbine and the impeller are supported for rotation about an axial centerline of the torque converter, wherein the turbine includes a turbine shell connected to a transmission input shaft and configured to transfer torque to the transmission input shaft, wherein the turbine is further connected to an electrical machine that includes a rotor and a motor stator, a stator adjacent both the turbine and the impeller, wherein the stator is connected to a secondary housing via a stator shaft, and a disconnect clutch system connected to an engine and the impeller via an impeller shaft, wherein the disconnect clutch system is configured to transfer torque from the engine to the impeller via the impeller shaft.

According to one embodiment, a hybrid powertrain includes a torque converter including an impeller, a turbine, a stator, and a disconnect clutch system connected to an engine and the impeller, wherein the disconnect clutch system is configured to transfer torque from the engine to the impeller before torque transfers to the turbine without transferring torque to a torque converter cover. The hybrid powertrain also includes an electric machine including a rotor and motor stator, wherein the electrical machine is configured to transfer torque to a transmission input shaft.

According to one embodiment, a hybrid powertrain includes a torque converter including an impeller, a turbine, and a stator, wherein the impeller is configured to receive torque from the engine input shaft without utilizing a torque converter cover or shell. The hybrid powertrain includes an electric machine including a rotor and motor stator, wherein the electrical machine is configured to transfer torque to a transmission input via the rotor.

DETAILED DESCRIPTION

Figure 1:
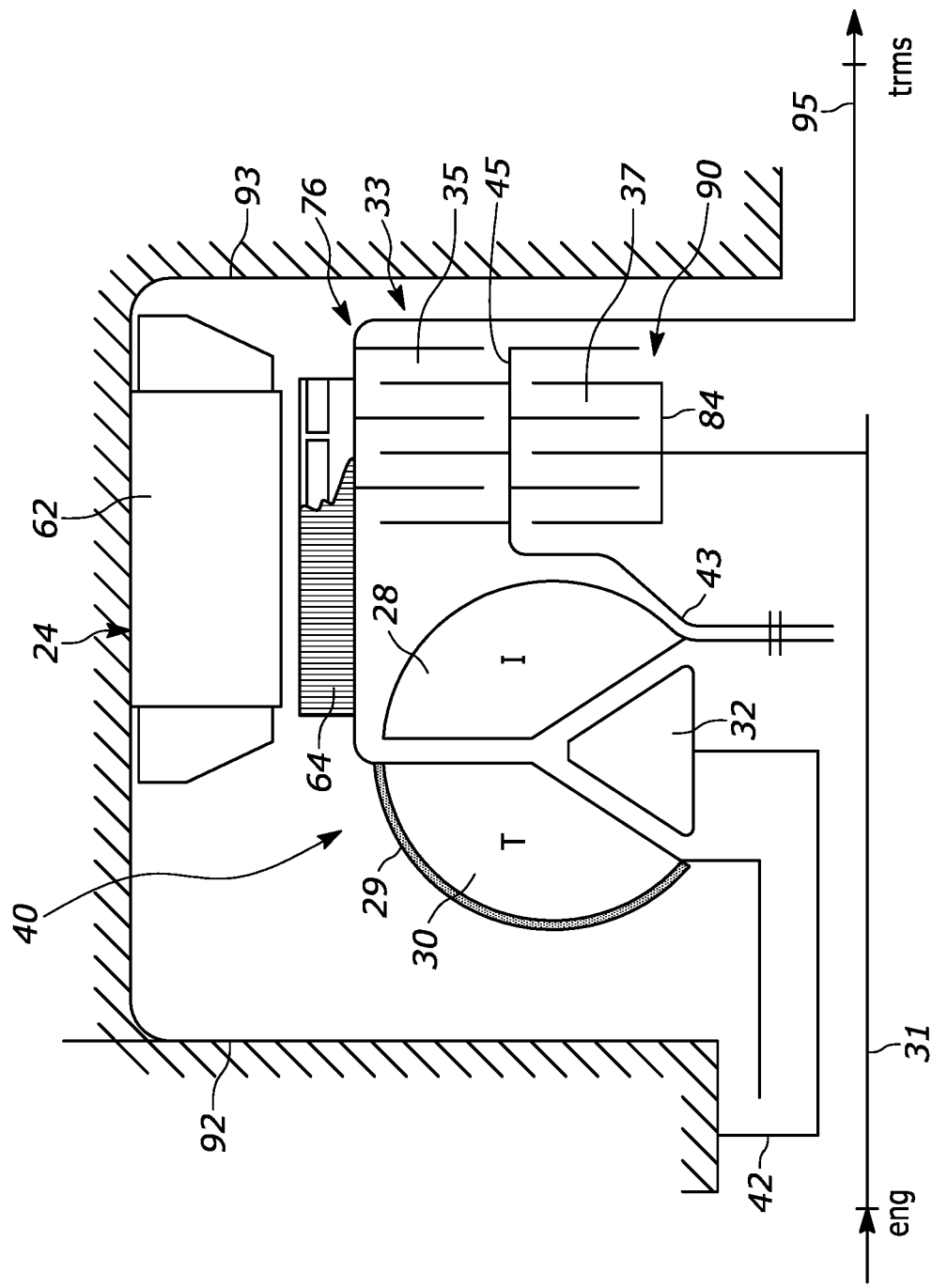
FIG. 1 discloses a side cross-section view of a hybrid powertrain focusing on the torque converter portion of the disclosed embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein are made with reference to the views and orientations shown in the exemplary figures. A central axis is shown in the figures and described below. Terms such as "outer" and "inner" are relative to the central axis. For example, an "outer" surface means that the surfaces faces away from the central axis, or is outboard of another "inner" surface. Terms such as "radial," "diameter," "circumference," etc. also are relative to the central axis. The terms "front," "rear," "upper" and "lower" designate directions in the drawings to which reference is made.

FIG. 1 discloses a side cross-section view of the hybrid powertrain focusing on the torque converter portion of the embodiment. The hybrid powertrain system may be a P2 hybrid system, or any other hybrid system, such as a P1 hybrid system, P3 hybrid system, P4 hybrid system, etc. The hybrid powertrain system, may include an engine output shaft 31 that connects an internal combustion engine to a clutch assembly 33. The clutch assembly 33 may include a disconnect clutch 37 that transfers torque received from the engine via the engine output shaft 31 to a fluid coupling (e.g., torque converter) when engaged. The clutch assembly 33 may be utilized to isolate the engine when disengaged.

A fluid coupling, such as torque converter 40, may be configured to receive power from the disconnect clutch 37 (e.g., k0 clutch). The torque converter 40 may include an impeller 28, a turbine 30, and a stator 32. The turbine 30 may include a hub that may connect to an oil pump for the transmission. Unlike a traditional torque converter, the embodiment disclosed below may have an impeller 28 and the turbine 30 that are flipped in terms of typical operation. The impeller 28 may be separated from a housing and may include a stamped component that carries the blades. The impeller 28 may be connected to the disconnect clutch 37 by an internal shell 43 (e.g., impeller shaft or impeller shell). The stator 32 may be supported on a stator shaft 42 that may be fixed (e.g., welded, bolted, etc.) to the secondary housing 92 or other support structure. Likewise, the secondary housing 92 may connected to a primary housing 93 via a bolt-connection, weld connection, or any other type of fixed connection.

Internal shell 43 may include an axially extending portion 45 that is integrated with the clutch assembly 33. The disconnect clutch 37 may include an abutment (e.g., annular abutment) extending radially inwardly that is supported on the output shaft 31. A hub of the annular abutment is non-rotatably connected to the output shaft 31, such as by a spline connection. A clutch pack 90 (or single-disc clutch in other embodiments) may be supported on an outer portion of the abutment. The disconnect clutch may be configured to selectively couple the internal shell 43 to the abutment. The clutch pack 90 may include a plurality of clutch discs and a plurality of clutch plates interleaved with the clutch discs. The clutch pack 90 is selectively engaged and disengaged by stroking a hydraulic piston (not shown).

An electrical machine 24 (e.g., electric motor or e-motor) is disposed in the housing 93. The electric machine 24 may include a stator 62 fixed to the housing 93 and a rotor 64 supported for rotation within, and relative to, the stator 62. At least a portion of the torque converter 40 and the clutch assembly 33 may be disposed within a hollow center of the rotor 64. The rotor 64 may be non-rotatably coupled to the turbine 30 via a fixed connection between the turbine shell 29 and the rotor 64. In the exemplary embodiment, the electrical machine 24 may be on the transmission input side, and not connected on the impeller side, thus power can be passed through the torque converter. With an under-sized torque converter, such a configuration may generate issues with heat generation. Thus, by placing the electrical machine 24 on the output side of the torque converter 40, with the same given output torque, the system may apply less power through the torus (e.g., impeller 28, turbine 30, stator 32) without having losses at the torus. Thus, power derived from the electrical machine 24 may not need to pass through the torus to transfer torque to the transmission input. The turbine shell 29 may be the component to output the torque transfer to the transmission from the engine, as opposed to a conventional torque converter which may utilize the shell as the input.

The clutch assembly 33 may also include a bypass clutch 35. The bypass clutch 35 may be configured to connect the impeller 28 to the turbine shell 29 in a fixed manner, bypassing the fluid torque path. When both the bypass clutch 35 and the disconnect clutch 37 are engaged, the output shaft 31 is mechanically connected to the turbine shell 29 through the clutch assembly 33 thus mechanically connecting the engine to the transmission input 95.

The bypass clutch 35 may include a clutch pack 76 (as shown) or may be a single disc clutch. The clutch pack 76 may include a plurality of clutch plates grounded to the shell 29, such as by a spline connection, and a plurality of clutch discs interleaved with the clutch plates. The clutch discs are fixedly coupled to the internal shell 43. The clutch pack 76 is engaged and disengaged by stroking a hydraulic piston (not shown).

The engine shaft 31 carries engine torque to the fluid coupling 40. The clutch plates, when engaged, carry the engine torque mechanically to the impeller 28, which then transfers the torque fluidly to the turbine 30, and then the torque is multiplied via the stator 32. Thus, in such an embodiment, the torque input that is transferred from the engine is transferred via an internal shell 43 of the impeller 28 (which may be connected to the disconnect clutch 37), rather than an outer cover as in previous designs. When the disconnect clutch 37 is closed and the bypass clutch 35 is open, torque may flow from the engine shaft 31 and through the torque converter 40. However, when the bypass clutch 35 is also closed, torque may bypass the torque converter 40 and transfer directly to the turbine shell 29 and transmission input 95. The disconnect clutch 37 may be utilized to disconnect the engine from the impeller 28. However, the impeller 28 may not include an outer cover or outer shell in an embodiment of this disclosure. In contrast, the turbine shell 29 may be utilized to output torque to the transmission input shaft 95 in the current embodiment.

The hybrid system may also operate in a conventional release mode. In conventional release mode, the bypass clutch 35 may be open and the engine may be operating. Thus, torque is transmitted from the internal combustion engine through the disconnected clutch 37 to the impeller 28 via the shaft. The torque passed through the disconnect clutch plates to the internal shell 43 via hydraulic apply pressure used to control the clutch. The impeller 28 transfers torque via moment transfer through the fluid to the turbine 30 by utilizing the stator 32 to generate torque ratio and improve efficiency of the system. Torque passes from the turbine through the shell 29 to the outer cover via a fixed connection, then to the transmission input shaft 95. Supplemental torque can be directly applied to the transmission input via the e-motor through the shell 29 without increasing the power input to the torque converter torus.

The hybrid system may also operate in a release mode when the bypass clutch is open. When in the release mode (e.g., torque converter open mode) and having the engine and e-motor operating, the torque may be supplied by the engine via the shaft 31. Torque may be passed through the disconnect clutch 37 to the impeller 28. The impeller 28 may drive fluid through the impeller blades to transfer torque to the turbine 30. Torque may be carried through the turbine shell 29 via a fixed connection to the turbine blades. The torque is passed through the shell 29 to the transmission input shaft through a fixed or spline connection. The e-motor 24 may supplement torque to the outer cover via the e-motor rotor 64 in addition to the engine torque that is transmitted through the clutch 33 and the torus. The engine torque may then be multiplied by the torus before passing to the shell and the e-motor 24 may supplement torque to the shell through the fixed rotor carrier connection.

The hybrid system may also operate in a conventional apply mode. In conventional apply mode (e.g., closed mode), both the disconnect (K0) clutch 37 and the torque converter lock-up or bypass clutch 35 can be applied or closed to allow torque to be passed from the engine (e.g., internal combustion engine) to the impeller 28 and from the impeller 28 directly to the shell 29 without the use of the fluid circuit. Supplemental torque can again be applied directly to the transmission input shaft 95 via the e-motor 24 through torque converter shell 29. The system can also be run in full electric mode by driving the transmission input shaft with the e-motor 24 only by opening both the clutch 33 and the torque converter bypass clutch 35.

The hybrid system may also include an operation where only the e-motor 24 is utilized. In an e-motor 24 only operation mode (e.g., drive and generation), the e-motor 24 may drive or be driven by the turbine shell 29 through a fixed connection between the outer shell and the e-motor rotor 64. The e-motor 24 may supply torque to the torque converter shell 29 which drives the transmission through either a fixed or spline connection. The torque converter bypass clutch 35 can be applied to minimize fluid losses by preventing relative motion between the impeller and turbine (lock up and hold at sync speed). The clutch 33 should be open to minimize any drag from the internal combustion engine. Alternatively, both clutches 35, 37 may be open in this mode.

In another operation mode, the e-motor 24 may only be used to supply torque during a start-up operation of the internal combustion engine. The e-motor 24 may drive, or be driven by, an outer shell through a fixed connection between the outer shell and the e-motor rotor 64. The e-motor 24 may supply torque to the torque converter shell which may drive the transmission through either a fixed or spline connection. The torque converter clutch can be applied to minimize fluid losses by preventing relative motion between the impeller and turbine (e.g., lock up and hold at sync speed). The clutch assembly 33 can be actuated in conjunction with the torque converter bypass clutch 35 via hydraulically applied pressure to transmit torque to an impeller shaft and in turn the crankshaft of the engine for startup. In startup mode, the e-motor 24 may thus supply torque to both the engine and the transmission simultaneously to drive the vehicle and start the engine.

Various operating modes can be controlled by utilizing pressurized flow passages through a traditional location of the transmission input shaft and through additional flow passages located in the secondary housing 92 which can direct oil through the engine input shaft and the stator shaft 42. When the clutch 33 is open, and the engine is off, the hybrid powertrain can allow the electrical machine 24 to drive. The torque would transfer from the electrical machine rotor, to the shell 29. In such a situation, drag torque spins through the shell, but with little to no power to transfer to the torus. The hybrid powertrain system may include both a secondary housing 92 and a primary housing 93. Both the secondary housing 92 and primary housing 93 may be utilized to ground torque received from various components of the hybrid powertrain system. The secondary housing 92 may be a stationary wall that comes down to the engine side of the electrical machine 24 and connects to the stationary stator shaft 42.

Figure 2:
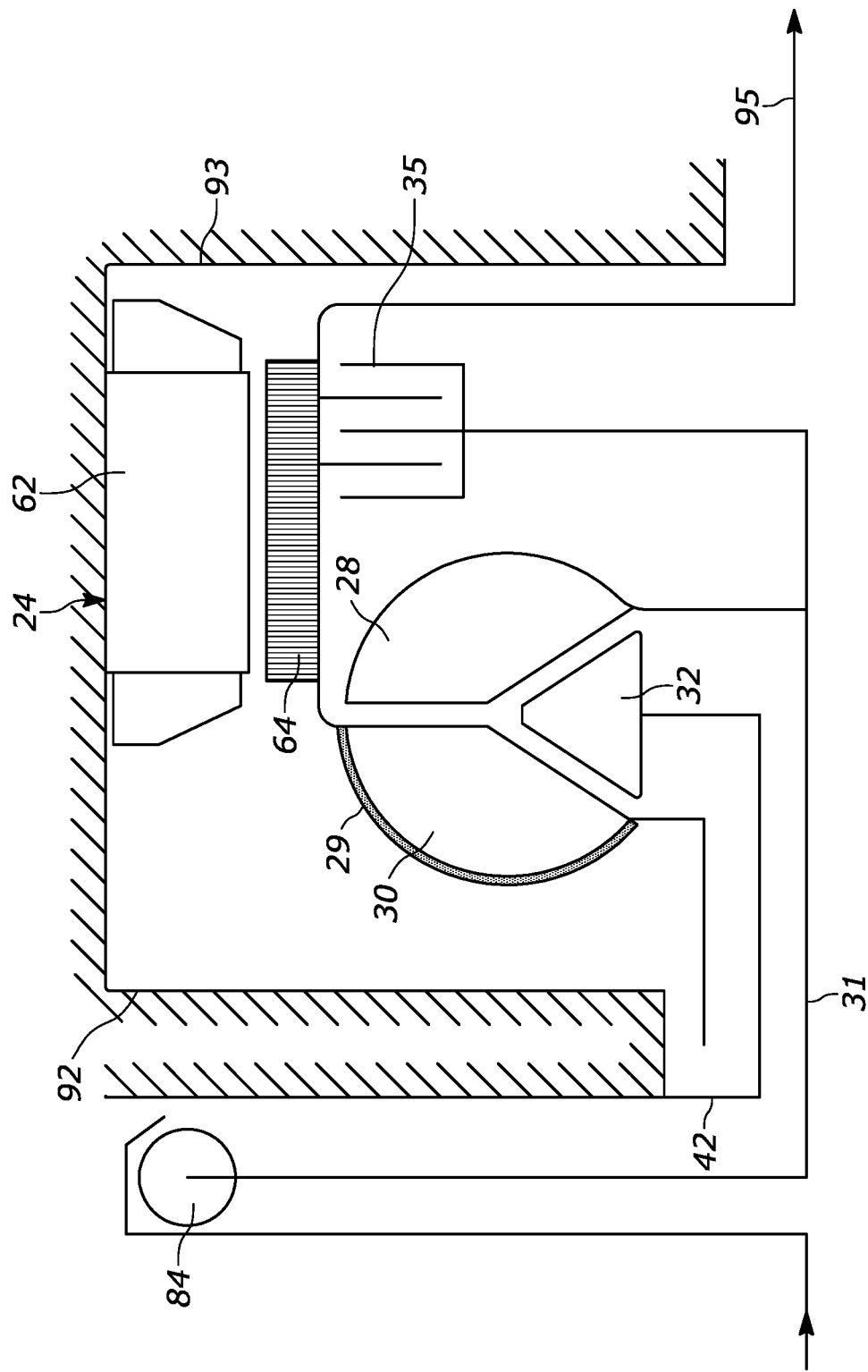
FIG. 2 discloses an embodiment of a side cross-section view of a hybrid powertrain focusing on the torque converter portion of an alternative embodiment that includes a disconnect clutch to bypass the hydrodynamic coupling.

FIG. 2 discloses an embodiment of a side cross-section view of a hybrid powertrain focusing on the torque converter portion of an alternative embodiment that includes a disconnect clutch to bypass the hydrodynamic coupling. In FIG. 2, torque is transferred from the engine via the crank shaft 82 and can travel to the turbine 30 via the hydrodynamic coupling. The crank shaft 82 transmits torque from the engine through an engine damper 84. The turbine 30 may be connected to the torque converter shell 29. In such an embodiment, the torque can be transmitted to the e-motor rotor 64 or the transmission input shaft 95. The torque converter can also contact a clutch that can lock and bypass the torque path through the hydrodynamic coupling and directly connect the engine input shaft to the torque converter shell 29. A bypass clutch 35 may be operable to mechanically couple the shaft 31 to the rotor 64 when engaged thereby bypassing the torque converter.

Figure 3:
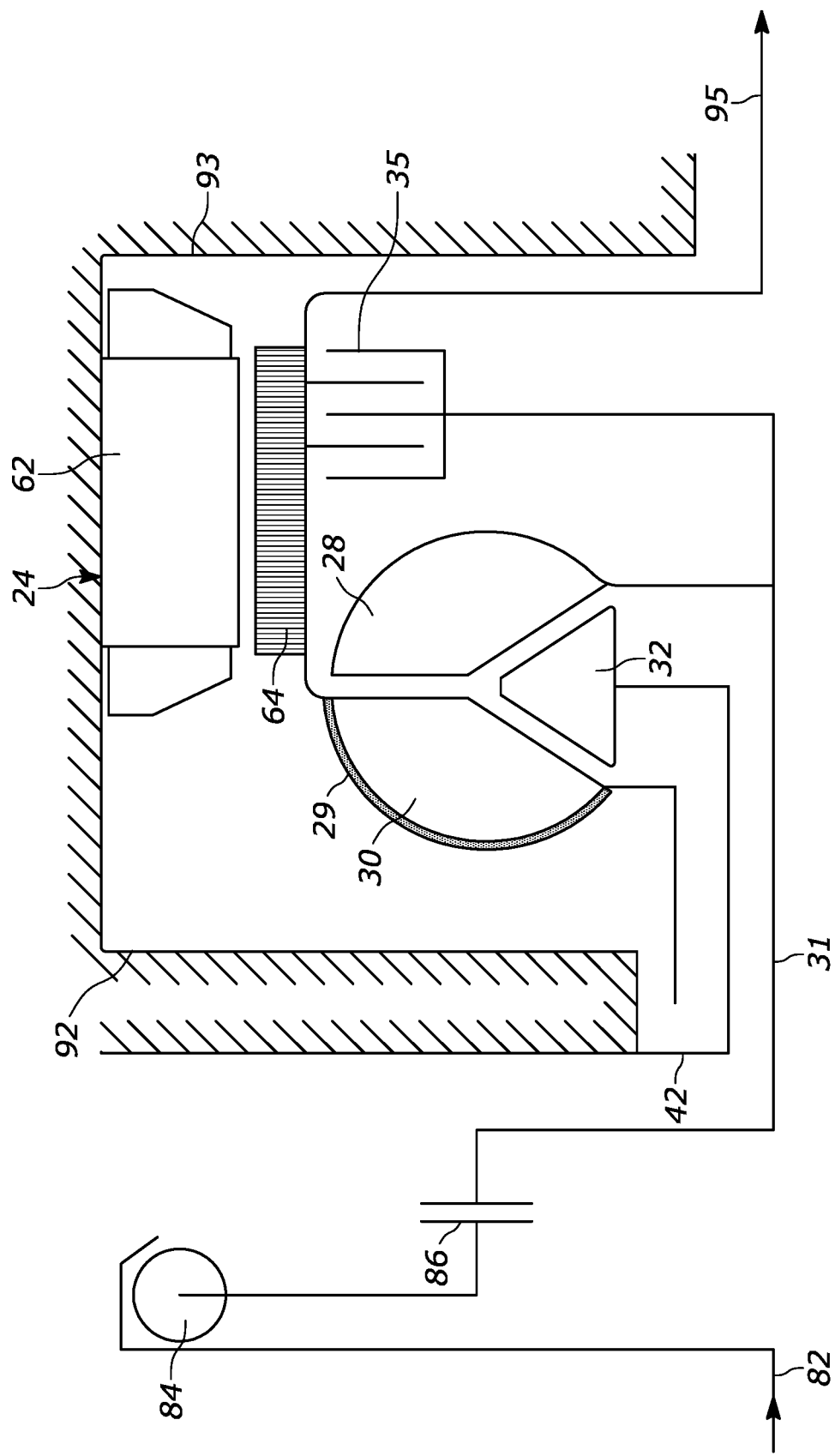
FIG. 3 discloses an embodiment of a side cross-section view of a hybrid powertrain focusing on the torque converter portion of an alternative embodiment that includes a disconnect clutch between the engine damper and hybrid drive module.

FIG. 3 discloses an embodiment of a side cross-section view of a hybrid powertrain focusing on the torque converter portion of an alternative embodiment that includes a disconnect clutch 86 between the engine damper 84 and hybrid drive module. In FIG. 3, torque comes from the engine via the crank shaft 82. The disconnect clutch 86 may be located outside of the hybrid powertrain module, as opposed to the other embodiments described herein. The crank shaft 82 transmits torque from the engine through an engine damper 84. In such an embodiment, the hybrid powertrain module may include a disconnect clutch 86 between the engine damper 84 and the hybrid module. The torque may flow through the disconnect clutch 86 into the engine output shaft 31. Such an arrangement may allow the e-motor 24 to transfer torque directly to the transmission input shaft 95, instead of flowing through the fluid coupling (e.g., torque converter 40) or torque converter clutch 35. Such an embodiment may reduce the amount of heat generated in the torque converter 40 and allow the torque converter 40 to be smaller. The e-motor 24 can also transfer torque to the engine for starting operation of the engine by engaging the torque converter clutch 35, or by transferring torque through the fluid coupling (e.g., torque converter 40).

Figure 4:
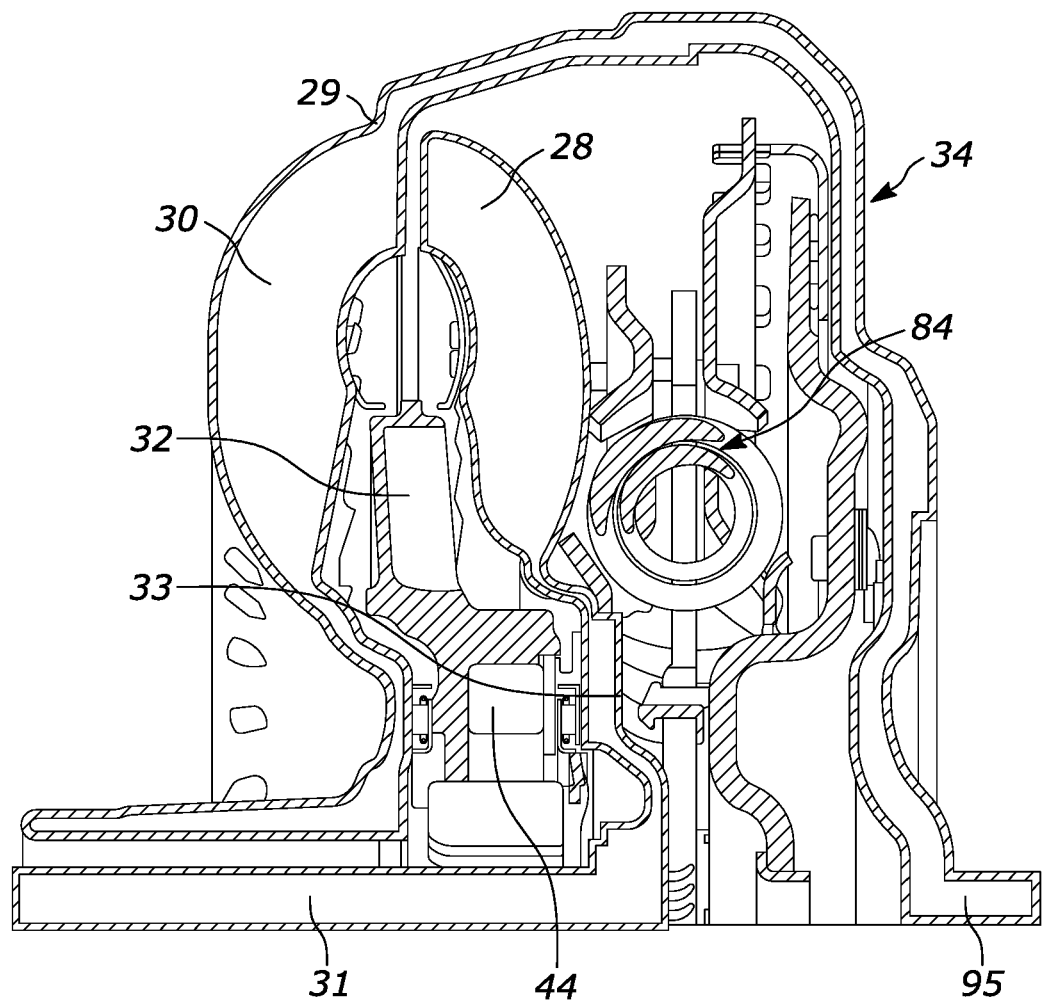
FIG. 4 discloses a side cross-sectional schematic view of a powertrain.

FIG. 4 discloses an example of a powertrain system according to an embodiment of the disclosure. A torque converter may be coupled between an engine and a transmission. The torque converter may include a case 29 (e.g., cover) having a turbine 30 fixed thereto. The shell 29 may be coupled to a transmission input shaft 95. The impeller 28 and the turbine 30 may be configured to fluidly couple and transmit power from the impeller 28 to the turbine 30 when the impeller 28 rotates faster than the turbine 30. The impeller 28 may be coupled to the engine via an engine output shaft 31.

The torque converter may include a clutch 34 (e.g. bypass clutch) may be configured to mechanically couple the impeller 28 to the shell 29 to bypass the fluid coupling between the impeller 28 and the turbine 30. The clutch 34 may include a one or more clutch disks supported for rotation about an axial centerline of the torque converter 40. The clutch disk may be configured to engage with the shell 29. When the clutch 34 is engaged, torque may be transferred from the impeller 28 to the shell 29. The engine shaft 31 may transmit torque from the engine through a damper 84. Many types of bypass clutches are known, and this disclosure is not limited to the illustrated embodiment.

The torque converter also includes a stator assembly having a stator 32 coupled to a stator shaft 42 by a one-way clutch. The stator 32 may include an outer ring and a plurality of blades that are circumferentially arranged between a hub and the outer ring. The stator assembly is supported on a stator shaft (not shown) that is fixed to a housing that is stationary relative to the torque converter 40. When the turbine shaft is stationary or rotating slowly compared to the crankshaft, the one-way clutch 44 of the stator assembly holds the stator 32 stationary. Rotation of the impeller 28 forces fluid to move between the impeller 28, the turbine 30, and the stator 32. The fluid exerts a hydrodynamic torque on the turbine 30. The stator 32 provides a reaction force such that the torque on the turbine 30 can be greater than the torque on the impeller 28. When the speed of the turbine 30 approaches that of the impeller 28, fluid tends to flow around the centerline of the torque converter causing the one-way clutch 44 to overrun.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

Parts List
24 electrical machine (e.g., e-motor)
28 impeller
29 shell
30 turbine
31 engine output shaft
32 stator
33 clutch assembly
34 clutch
35 bypass clutch
37 disconnect clutch
40 torque converter
42 stator shaft
43 internal shell
44 one-way clutch
45 axially extended portion
62 stator
64 rotor
76 clutch pack
86 disconnect clutch
90 clutch pack
92 secondary housing
93 primary housing
95 transmission input shaft

What is claimed is:

1. A torque converter comprising: an impeller;
a turbine configured to fluidly couple with the impeller, wherein the turbine and the impeller are supported for rotation about an axial centerline of the torque converter, wherein the turbine includes a turbine shell connected to a transmission input shaft and configured to transfer torque to the transmission input shaft, wherein the turbine is further connected to an electrical machine that includes a rotor and a motor stator, wherein the turbine shell is non-rotatably connected to the rotor via a fixed connection;
a stator connected to a secondary housing via a stator shaft;
a disconnect clutch assembly connected to an engine and the impeller via an impeller shaft, wherein the disconnect clutch assembly is configured to transfer torque from the engine to the impeller via the impeller shaft; and
wherein the torque converter is configured to run in full electric mode by driving the transmission input shaft with the electrical machine in response to opening both the disconnect clutch assembly and a torque converter clutch assembly connected to the rotor of the electrical machine.

2. The torque converter of claim 1, wherein the turbine is axially arranged toward the engine as opposed to the transmission input shaft.

3. The torque converter of claim 2, wherein the disconnect clutch assembly is radially outward from the axial centerline of the torque converter.

4. The torque converter of claim 1, wherein the motor stator is connected to a primary housing, wherein the primary housing is connected to the secondary housing.

5. The torque converter of claim 1, wherein the torque converter is configured to activate a conventional release mode configured to transmit torque from the engine through the disconnect clutch assembly to the impeller.

6. The torque converter of claim 1, wherein the torque converter is configured to activate a conventional apply mode configured to allow the disconnect clutch assembly and a torque converter bypass clutch assembly to be applied to allow torque to be passed from the engine to the impeller, and from the impeller directly to a torque converter shell without the use of a fluid circuit.

7. A hybrid powertrain comprising:
a torque converter including an impeller, a turbine, a turbine shell, a stator, and a disconnect clutch assembly connected to an engine and the impeller, wherein the disconnect clutch assembly is configured to transfer torque from the engine to the impeller before torque transfers to the turbine; and
an electric machine including a rotor and motor stator, wherein a torque converter clutch assembly is connected to the rotor;
wherein the turbine shell is non-rotatably connected to the rotor via a fixed connection, and wherein the rotor is configured to transfer torque to a transmission input shaft via the fixed connection; and
wherein the hybrid powertrain is configured to run in full electric mode by driving a transmission input shaft with the electric machine in response to opening both the disconnect clutch assembly and the torque converter clutch assembly.

8. The hybrid powertrain of claim 7, wherein the torque converter is configured to activate a conventional release mode configured to transmit torque from the engine through the clutch assembly to the impeller via an impeller shaft.

9. The hybrid powertrain of claim 7, wherein the torque converter is configured to activate a conventional apply mode configured to allow the clutch assembly and a torque converter bypass clutch assembly to be applied to allow torque to be passed from the engine to the impeller, and from the impeller directly to a torque converter shell without the use of a fluid coupling.

10. The hybrid powertrain of claim 7, wherein the turbine shell is non-rotatably connected to the transmission input via the fixed connection.

11. The hybrid powertrain of claim 7, wherein the impeller is directly connected to an engine input shaft.

12. A hybrid powertrain comprising:
a torque converter including an impeller, a turbine, a turbine shell, and a stator, wherein the impeller is configured to receive torque from an engine input shaft; and
a disconnect clutch system connected to an engine input shaft and the impeller, wherein the disconnect clutch system is configured to transfer torque from the engine input shaft to the impeller before torque transfers to the turbine;

an electric machine including a rotor and motor stator, wherein the turbine shell is non-rotatably connected to the rotor and to a transmission input shaft via a fixed connection such that the turbine shell and the rotor can both transfer torque directly to the transmission input shaft; and wherein the hybrid powertrain is configured to run in full electric mode by driving the transmission input shaft with the electric machine in response to opening both the disconnect clutch system and a torque converter clutch system.

13. The hybrid powertrain of claim 12, wherein the stator is connected to a stator shaft connected to a housing of the hybrid powertrain.

14. The hybrid powertrain of claim 12, wherein the disconnect clutch system is radially inward towards an axial centerline of rotation about of the torque converter as compared to the torque converter clutch system.

15. The hybrid powertrain of claim 14, wherein the torque converter clutch system is connected to the rotor of the electrical machine.

16. The hybrid powertrain of claim 12, wherein the motor stator is connected to a primary housing that is welded to a secondary housing, wherein the secondary housing is connected to a stator shaft coupled to the stator.

\* \* \* \* \*